CARRIER TELEGRAPH SYSTEM

Filed Aug. 7, 1951 3 Sheets-Sheet 1

INVENTORS: L. A. GARDNER
J. L. HYSKO
BY M. R. McKenney
ATTORNEY

INVENTORS: L. A. GARDNER
J. L. HYSKO
BY
M. R. McKenney
ATTORNEY

Jan. 26, 1954 L. A. GARDNER ET AL 2,667,536

CARRIER TELEGRAPH SYSTEM

Filed Aug. 7, 1951

3 Sheets-Sheet 3

INVENTORS: L. A. GARDNER
J. L. HYSKO
BY [signature]
ATTORNEY

Patented Jan. 26, 1954

2,667,536

UNITED STATES PATENT OFFICE 2,667,536

CARRIER TELEGRAPH SYSTEM

Leland A. Gardner and John L. Hysko, Summit, N. J., assignors to Bell Telephone Laboratories, Incorporated, New York, N. Y., a corporation of New York Application August 7, 1951, Serial No. 240,628

10 Claims. (Cl. 178—66)

This invention relates to carrier telegraph systems and more particularly to frequency shift carrier telegraph systems utilizing separate frequencies for the "marking" and "spacing" signals.

An object of the invention is to make use of the inherent characteristics of a frequency shift carrier telegraph system to provide economical supervisory signaling arrangement by building into the carrier terminal means for activating such arrangements.

Other objects of the invention are to automatically shift the carrier frequency of the aforementioned telegraph system by vacuum tube and varistor keying under the control of telegraph direct current signals; to limit the received carrier signals to constant voltage, and to eliminate bias distortion introduced by noise and extraneous signals.

A feature of the invention is a modulator for switching the carrier oscillator "on" and "off" in response to direct-current telegraph supervisory signals.

Another feature of the invention is a varistor network for shifting the carrier oscillator from the "marking" to the "spacing" frequency or vice versa under the control of direct-current telegraph supervisory signals.

Another feature of the invention is a "break" which insures a rapid clean break when the receiving operator desires to stop transmission from the distant terminal.

Another feature of the invention is the floating output circuit which permits the cathodes of the output loop tubes in the receiving circuit to be connected to any direct current potential as required by the loop terminations used.

Another feature of the invention is the unbalanced detector circuit which centers the demodulated signals at a voltage negative with respect to the cathodes of the output loop tubes of the receiving circuit and thus avoids unbiased signals.

Another feature of the invention is the mark-hold feature which causes current to flow in the loop circuit when no incoming carrier from the distant terminal is being received.

In the system to be disclosed in this application, carrier telegraph communication between stations is accomplished by shifting the resonant frequencies $\nu_1$ and $\nu_2$ of a carrier oscillator ($\nu_1$ and $\nu_2$ corresponding to the marking and spacing frequency respectively) by means of a modulator and varistor network responsive to direct-current telegraph signals. In accordance with the present invention, supervisory signals are provided between terminals by keying the oscillator to provide "on" and "off" carrier signals, which are transmitted and separately detected in a receiver for detecting the carrier frequencies $\nu_1$ and $\nu_2$ at a distant station.

Reception requires means sensitive to frequency changes to distinguish between the spacing and marking elements of the signals. This is provided in the receiver by a discriminator circuit which consists essentially of two filters, the one responsive to the marking frequency and the other to the spacing frequency. Each of these discriminator filters is associated with a separate varistor rectifier followed by vacuum tube switches for open and closed circuit operation with reference to the direct-current telegraph loops.

Referring to the figures of the drawing.

In conventional amplitude modulation telegraph circuits, signals are formed by sending out carrier current over the line for marking and interrupting transmission entirely for spacing. In a frequency shift system, such as disclosed herein, the marking condition as denoted by periods of carrier of a particular frequency $\nu_1$ and the spacing condition of similar periods of a second frequency $\nu_2$. During telegraph signal transmission periods, the magnitude of the current applied to the carrier line or medium is thus substantially constant whether marking or spacing, only the frequency changing.

Figures 1, 5:
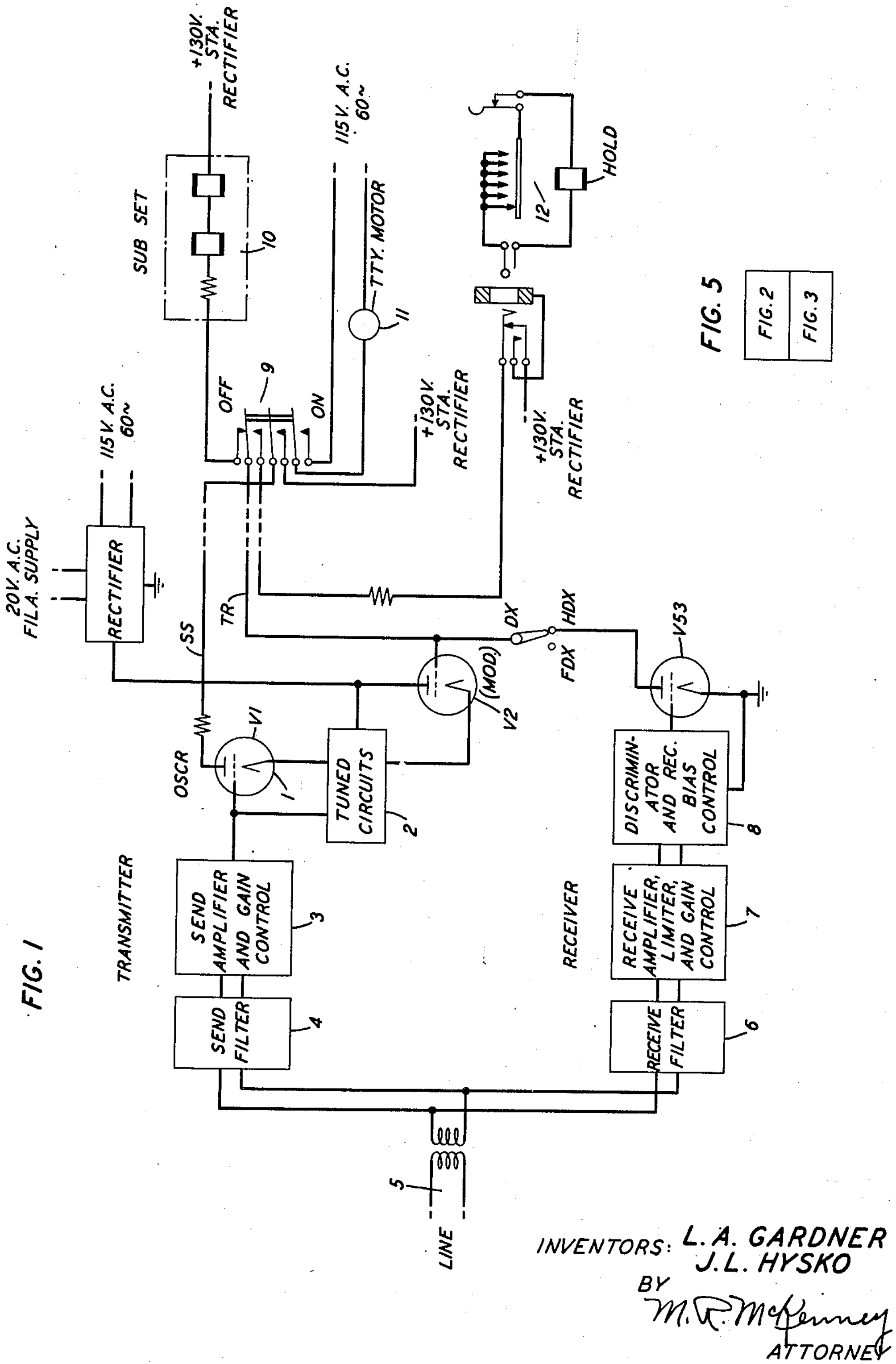
Fig. 1 shows a block schematic diagram of one terminal of a frequency shift telegraph system in accordance with the invention.
Fig. 5 shows the relation of Fig. 2 to Fig. 3.

Referring to Fig. 1 which discloses one terminal of a complete telegraph system, sending is performed by means of a modulator tube V2 which shifts the frequency of the carrier oscillator source 1, for example, by about 70 to 100 cycles at each signal transition. The desired frequency shift is obtained by altering the resonance constants of the carrier oscillator tuned circuit 2 which determine the frequency at which the oscillator works.

Both marking and spacing frequencies are produced by the single electron tube oscillator 1 which consists of triode V1 and the associated tuned circuit 2 which determines the oscillation frequency.

The marking and spacing frequencies thus produced are amplified by the amplifier 3 and transmitted through send filter 4 whence they are propagated over transmission line 5 to a distant station, central office or teletypewriter switchboard office and received by receiving apparatus substantially corresponding to blocks 6, 7 and 8 which are respectively a receiving filter and amplifier limiter and discriminator circuit.

At an attended TWX station, the power switch 9 in the "off" position shown in Fig. 1, serves to connect the subset 10 to the transmission lead TR and the "send supervision" lead SS is not connected to +130 volts. The subset 10 is mechanically biased and operates on current and no-current at a 20-cycle rate.

When a supervisory ringing signal is received from the distant switchboard, it is passed through the receiving channel 6, 7, 8 and tube V53, whence it operates the subset 10.

The subscriber answers by operating the power switch 9 to the "on" position. Operation of the power switch serves to disconnect the subset from the transmission lead TR, starts the teletypewriter motor 11 and supplies plate potential +130 volts over lead SS to start the oscillator V1 in the channel terminal.

The starting of the oscillator results in the transmission of a marking carrier to the switchboard. The teletypewriter 12 is in condition to send or receive.

*Frequency shift oscillator and modulator*

Figures 2, 4:
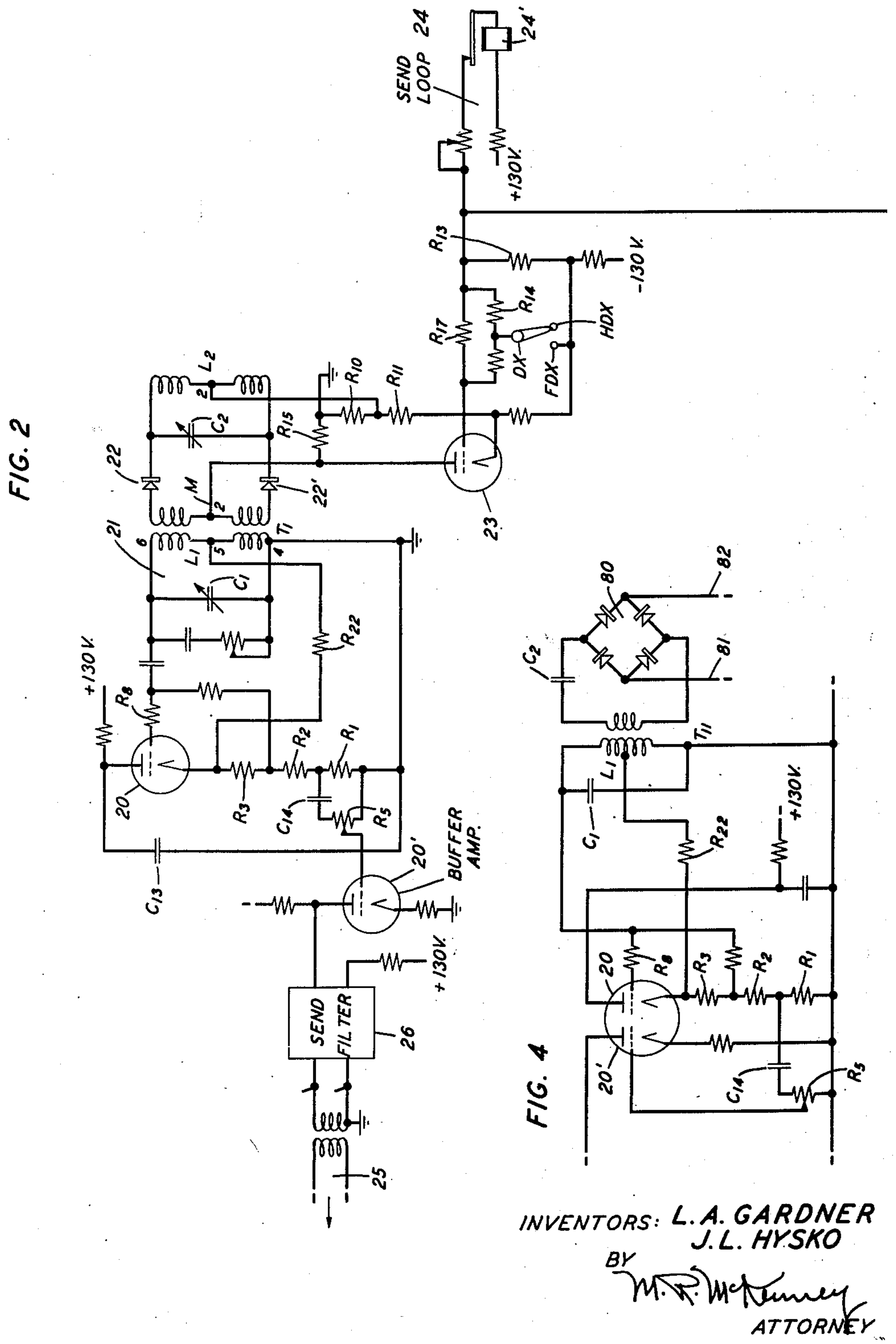
Figs. 2 and 3 show respectively the transmitting and receiving circuits thereof.
Fig. 4 shows a modification of the telegraph carrier oscillator.

Referring to Fig. 2, which shows the transmitting, receiving and supervisory circuits of the system, the carrier telegraph transmitter comprises an oscillator 20 having a tuned circuit 21 in its feedback path. The tuned circuit 21 is tunable to two discrete frequencies $\nu_1$ and $\nu_2$, termed the normal and shifted frequency respectively. The oscillator 20 generates the normal frequency $\nu_1$, determined by variable capacitor C1 and the primary coil L1 of transformer T1, which frequency represents the marking condition. For spacing, the frequency of the oscillator is then shifted to $\nu_2$ by the coupling of additional reactance $L_2$—$C_2$ into the tuned circuit. The switching of the added reactance is under the control of varistors 22, 22', whose impedance, high or low is determined by a bias direct-current voltage on lead M.

The oscillator tube 20, which may be half of a twin triode vacuum tube, furnishes the necessary feedback gain to maintain oscillations. The other half of the twin triode, namely tube 20' constitutes a buffer amplifier between the oscillator 20 and the line 25. The output from the oscillator tube 20 supplies feedback to its frequency determining tuned circuit 21 through resistor R22 and winding 5—4 of input transformer T1. Resistor R8 serves to suppress parasitic oscillations.

The oscillating voltage which appears between winding 6—5 of transformer T1 is applied between the grid and cathode of tube 20 causing a current of the same frequency to circulate through the cathode-plate circuit of this tube, which includes condenser C13 and a group of resistances R1, R2, R3 in series with the cathode. The drop in the latter is applied to winding 4—5 of transformer T1 which furnishes the necessary coupling between the cathode and grid to sustain the oscillations. The grid of tube 20 is suitably biased by the direct-current component of the cathode current through resistance R3.

For the marking condition, the varistors 22, 22' are non-conducting or biased to provide a very high impedance, thereby rendering the secondary of transformer T1 ineffective and isolating the additional reactance $L_2$—$C_2$, so that the tuned circuit resonates at the marking frequency $$\nu_1=\frac{1}{2\pi\sqrt{L_1C_1}}$$

For the spacing condition, the varistors conduct and the oscillator frequency is shifted to the spacing frequency $\nu_2$ by the coupling of added reactance $L_2$—$C_2$ in parallel into the tuned primary of transformer T1.

The switching of the additional reactance into the tuned circuit 21 is accomplished by biasing varistor 22, 22' to a low impedance value by means of the appropriate direct-current bias. If the net added reactance is capacitive the frequency is shifted to a lower value. If inductive, the frequency is shifted to a higher value.

The varistors 22, 22' function as series switches under the control of modulator tube 23, which may be half of a twin triode vacuum tube V2. As explained later, the grid of tube 23 is driven by the signals originating in the connecting direct-current telegraph circuit 24. Modulator tube 23 is thus caused to conduct for an outgoing mark and to be cut off for an outgoing space.

When modulator tube 23 is conducting, resistor R15 in series with the plate-cathode circuit of the tube is shunted across resistors R10 and R11. This condition produces a potential at the plate of tube 23 which is negative with respect to the voltage at the junction of resistors R10 and R11. This negative voltage is connected between terminal 2 of transformer T1 and terminal 2 of coil L2 and is thus impressed across varistors 22 and 22' in the non-conducting direction.

For the spacing condition, the tube 23 is cut off, a current flows through resistor R15, into center tap terminal 2 of input transformer T1, through varistors 22 and 22' and through retard coil L2 to the junction of resistors R10 and R11. This current divides and flows through each of the varistors 22 and 22', providing a positive bias voltage for the varistors which maintains them in a low impedance condition. Thereby the secondary of input transformer T1 is effectively coupled to the reactance of coil L2 and capacitor C2. This results in the oscillator operating at the spacing frequency $\nu_2$.

Since the voltage and current for controlling the impedance of the varistor units is fed into center taps, 2, 2 of the input transformer secondary and of the retard coil, respectively, no disturbing transients are coupled into the oscillator tuned circuit.

The marking frequency $\nu_1$ and the spacing frequency $\nu_2$ from the oscillator are passed through capacitor C14 into buffer amplifier 20', thence through send filter 26 and over the transmission medium, for example, line 25 to the distant terminal station. The send filter 26 is tuned to the mid-frequency of a frequency band comprised between $\nu_1$ and $\nu_2$.

Thus, signals are formed by shifting the carrier oscillator frequency between values $\nu_1$ and $\nu_2$ which are equal amounts above and below the nominal mid-band of the sending and receiving filters.

In full duplex operation, the DX switch (Figs. 2 and 3) is operated to the FDX position. When the send loop is closed to send a mark signal in full duplex operation, current flows from the +130 volt battery at the end of the send loop 24 through resistance R14 and the FDX side of the DX key contacts and then to −130 volt lead. The resulting voltage across resistance R14 is impressed between the grid and cathode of modulator tube 23, whose cathode is biased to a potential causing it to conduct. The resulting drop in voltage across R15 depresses the voltage at terminal 2 of coil T1 with respect to terminal 2 of coil L2, causing varistors 22 and 22′ to become non-conducting, thereby disconnecting L2 and the associated condenser C2 from the frequency determining circuit of the oscillator. The left-hand portion of the oscillator circuit, being tuned to the marking frequency $\nu_1$, causes marking current to flow through oscillator tube 20. Potentiometer R5 in turn applies a portion of this carrier voltage between the grid and cathode of sending amplifier tube 20′. Marking current is thereby impressed on the sending filter 26 and thence on the carrier line 25.

When the operator sends a space, thereby opening the loop 24 and disconnecting the +130 volt battery, the grid of tube 23 drops to −130 volt and since the cathode is then positive with respect to the grid, no current flows through the tube, causing the voltage on terminal 2 of transformer T1 to become positive with respect to terminal 2 of coil L2. The varistors are thereby made conducting so that L2 and its associated condenser C2 are added to the oscillator circuit changing its frequency to the spacing value $\nu_2$. This frequency is applied to the sending filter 26 and thence to the carrier medium precisely as in the case of a marking signal.

*Receiving circuit*

Figure 3:
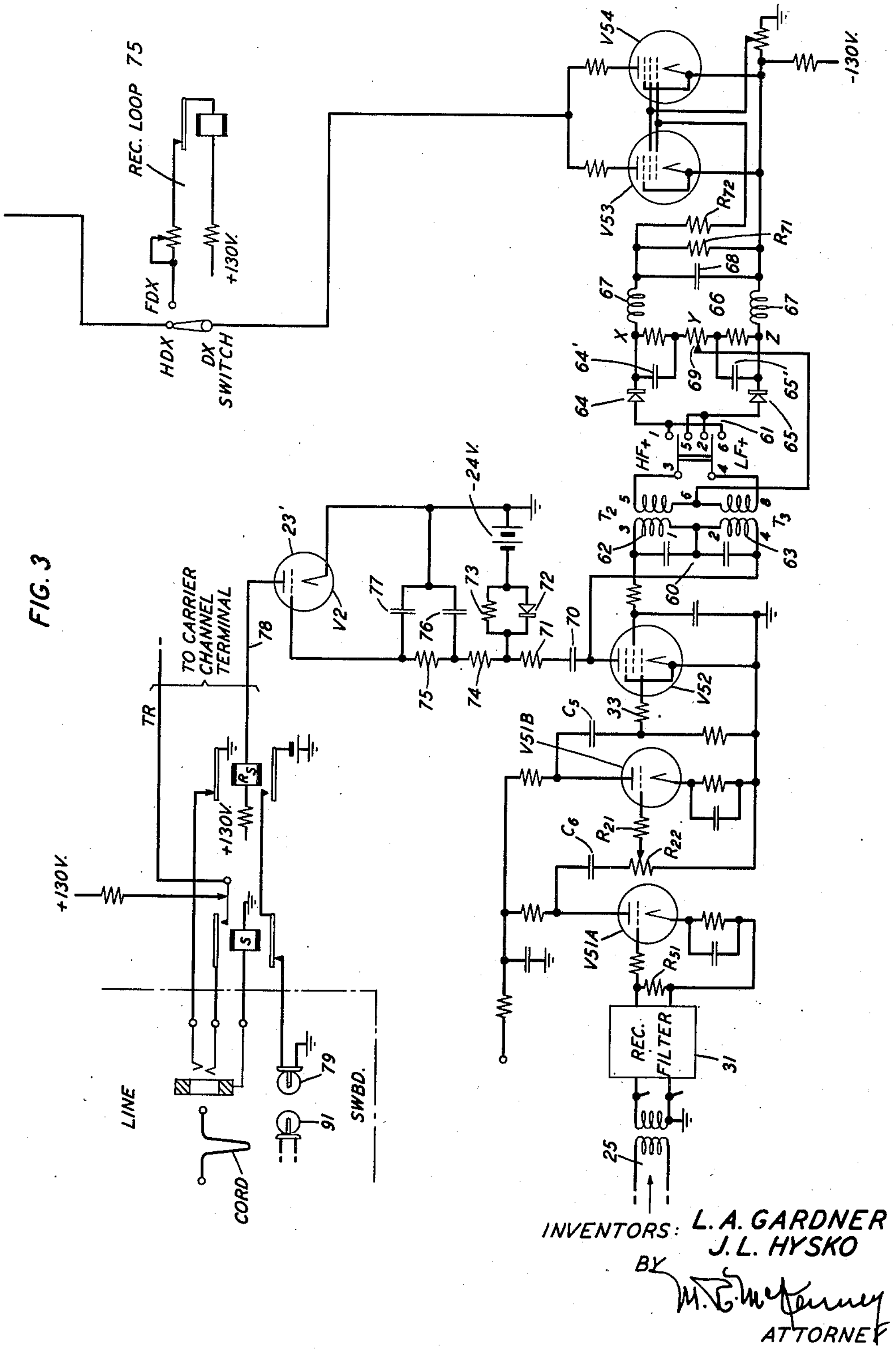

Fig. 3 shows the carrier telegraph receiving circuit. At the receiving end of the circuit the signal is selected by the appropriate receiving filter 31 which accepts a narrow band of frequencies centered about the mark and space frequencies $\nu_1$ and $\nu_2$ of the channel to be received. Like the sending filter of Fig. 2, the receive filter 31 provides an impedance transforming structure presenting 600 ohms towards the line but about 140,000 ohms towards the grid-cathode circuit R51 of the first amplifier stage V51A.

Tubes V51(A), V51(B) and V52 form an amplifier limiter, so that the output of tube V52 remains constant for wide variations in received level. When the received level is low, tube V52 does all of the limiting. The 1-megohm resistor 33 in series with its grid prevents the grid from going positive and so confines swings in plate current to the range from 0 to about 10 milliamperes. The output therefore is substantially constant for any signal level at the input of the receiving filter 31 exceeding about −50 decibels per mile. When this level is so high that grid current tends to flow in tubes V51(A) and V51(B), these tubes also contribute to the limiting action due to the resistance in the grid circuit.

Large carrier amplitudes are limited by tube V51A and small amplitudes are limited by tube V51B and/or tube V52.

The resistor R22 constitutes a gain control which is connected between the plate of tube V51A and the grid of tube V51B. It provides the means for adjusting the gain on the limiter amplifier aforementioned. The series grid resistor R21 serves to limit the positive grid swing for large signals and minimizes the amount of self-bias developed across coupling capacitor C6. This arrangement gives substantially symmetrical limiting of the carrier frequency wave form.

The output from the plate of tube V51B is coupled to the grid of pentode tube V52. The series grid resistor 33 limits the positive grid swing and minimizes the amount of self-bias across coupling capacitor C5 due to grid rectification.

The plate current of V52 passes through the primary side of the discriminator circuit 60. The discriminator consists of two anti-resonant circuits 62, 63 in series which are tuned respectively to somewhat higher and lower frequencies than $\nu_1$ and $\nu_2$, the marking and spacing frequencies respectively. The coils of the two tuned circuits 62, 63 are the primaries of the two independent one-to-one ratio transformers T2, T3, one primary being tuned to parallel resonance at the high frequency edge of the channel band and the other being tuned to parallel resonance at the low frequency edge of the channel band. The secondary windings of T2 and T3 are connected in series. Reversing switch 61 provides means for reversing the output connections from the discriminator network.

When the discriminator switch is operated to the HF+ position, the higher frequency is rectified by rectifier 64 and the lower by rectifier 65, resulting in direct-current voltages appearing across points XY and YZ respectively. These voltages are poled oppositely and their algebraic sum is applied between the grids and cathodes of tubes V53 and V54, which are connected in parallel. It follows that when the higher frequency is received, voltage XY predominates and the grids of these tubes are positive with respect to their cathodes, and when ZY is the larger they are negative. Condensers 64′ and 65′ respectively form a by-pass for the carrier currents.

The function of the limiter is apparent, for since the discriminator would translate either changes in frequency or changes in magnitude appearing at its input into corresponding voltage variations across XY and YZ, it is necessary that magnitude changes be first entirely eliminated by the limiting action of the preceding vacuum-tube stages. With the arrangement employed, tube V52 generates a plate-to-cathode alternating-current voltage which is independent of signal magnitude or frequency, but this voltage (or the greater part of it) is alternately shifted between the input terminals 3—1 and 2—4 of the discriminator transformer, depending on whether a marking or spacing frequency is received. Fundamentally, the limiting action is secured by producing an amount of amplification in tubes V51(A) and V51(B) which is far in excess of that required to obtain the needed voltage across XY and YZ and then severely curbing the magnitude of their outputs. Due to this action, variations in level which affect equally the marking and spacing frequencies cause no signal distortion; in other words, frequency-shift operation gives extremely effective level compensation.

The rectified signals are passed through the low-pass filter 66 consisting of retard coils 67 and condenser 68. The low-pass filter has a cut-off frequency near 40 cycles and thus also serves to attenuate interference arising from extraneous frequency components differing from the carrier frequency by more than 40 cycles. A balanced low-pass filter structure without mutual inductance is used in order to present high and nearly equal impedances to ground. This prevents a change in the tuning of the discriminator when reversing switch 61 is operated for reversing connections from the discriminator. A positive or negative output may thereby be obtained by the marking condition. The discriminator switch 61 also permits normal operation with a reversal of the mark and space frequency assignments if desired.

The output of the low-pass filter is terminated by resistor R71 and is applied through grid limiting resistor R72 to the grids of output tubes V53 and V54. In order to center the demodulated signals on the grid characteristic of tubes V53 and V54 and thus avoid biased signals, the mean of the mark and space output voltages from the low-pass filter must be a few volts negative with respect to the cathodes of tubes V53 and V54. This is accomplished by adjustment of the potentiometer 69, by which the positive output condition may be made to be of less amplitude than the negative output condition. The potentiometer 69 also provides means for compensating for discrepancies in the discriminator and deviations in the marking and spacing frequencies from their theoretical values, also for other biases which may originate in the sending terminal.

Tubes V53 and V54 therefore act in unison as a single switch whose closing is controlled by positive signals across XZ and whose opening is effected by negative signals across these same points, i. e., they are equivalent to a receiving relay operated by polar signals. When signals are received, this "switch" closes the receiving loop circuit 75, Fig. 3 if the DX switch is operated to FDX, or loop 24 if the DX switch is operated to HDX permitting current from the +130 volt battery at its distant end to flow to the cathodes of tubes V53 and V54 and operate the receiving TTY to marking; when it opens under the influence of a negative voltage this current is broken and the TTY receives a spacing signal.

The grids of tubes V53 and V54 are connected through resistor R71 to the cathodes of these tubes. Hence, when no carrier is being received from the distant terminal, current will flow in the receiving loop holding the receiving teletypewriter closed to marking, since the grids and cathodes of those tubes are at the same potential. This is known as the "mark-hold" feature.

When the higher channel-frequency is employed for spacing instead of marking, the right-hand part of the oscillating circuit 20 is made inductive instead of capacitive and the discriminator switch 61 is operated to LF+. This impresses the lower frequency through rectifier 64 and the resulting rectified voltage appears between points XY.

In half duplex operation, the DX switch is operated to the HDX position. In this condition, the plates of tubes V53 and V54 are connected to the send loop 24 and receive loop 75 is disconnected. When the operator at the end of loop 24 is sending signals the distant station is normally transmitting a steady marking signal so that the grids of tubes V53 and V54 (Fig. 3) are kept continually positive. These tubes will therefore conduct when the local operator sends a mark by closing send loop 24 and will be non-conducting when he sends a space by opening loop 24. During the mark, the grid of tube 23 (Fig. 2) is positive with respect to its cathode causing tube 23 to become conducting and to send out a marking signal over the carrier line as described for full duplex operation above. During a spacing signal the voltage at the grid of tube 23, which is connected to −130 volts through resistor R13 falls to −130 volts, tube 23 becomes non-conducting and spacing carrier is transmitted as previously described.

When mark and space signals are being received from the distant terminal, the local send loop 24 is normally held closed to mark. During the reception of a mark signal, a positive voltage is applied to the grids of tubes V53 and V54, these tubes conduct and current flows in the loop circuit. This results in a voltage, applied to the grid of tube 23, which is positive with respect to the cathode of tube 23 and marking carrier is transmitted over the carrier line as described above. When a spacing carrier signal is received from the distant terminal, a negative voltage is applied to the grids of tubes V53 and V54. This reduces the loop current in send loop 24 to nearly zero. The potential at the plates of tubes V53 and V54 rises to +130 volts in this condition due to the battery at the end of the local send loop. Thus the voltage applied to the grid of tube 23 becomes even more positive and tube 23 remains conducting so that an outgoing marking condition is sustained. Tube 23 therefore cuts off for a space from the subscriber loop and conducts for the marking condition and also remains conducting for the space condition toward the loop. This provides the half duplex action of the loop circuit.

The resistor R13 shown in Fig. 2 is effective in controlling the break characteristic of the telegraph circuit. When the subscriber opens the loop to break transmission coming from the receiving terminal, resistor 13 acts to insure that a spacing potential is applied to grid 7 of modulator tube 23 during intervals when the loop circuit is also opened by a cut-off condition of tubes V53 and V54.

*Supervisory signaling receiving circuit*

It is further necessary that supervisory relay RS be operated whenever the distant subscriber connects carrier to the line by closing his power switch, and that it be released when the carrier is again turned off. This control is exercised by means of current from tube 23', Fig. 3. Incoming carrier from the distant station operates relay RS to light the line lamp 79. After the cord is connected to the line jack, release of relay RS due to removal of carrier, applies ground to the jack to light the cord supervisory lamp 91. The signals from tube 23' therefore result in the application and removal of ground from the ring of jack to produce the necessary supervisory signals.

The reception of a supervisory carrier signal through the receiving filter 31 and its application to the grid of tube V52, results in an alternating-current flow from the plate of tube V52 through blocking condenser 70, resistor 71 and the parallel combination of resistance 73 and varistor 72 to the negative terminal of the filament battery, thence to ground and finally back to the cathode of V52. The rectifying action of varistor 72 sets up a direct-current voltage across resistor 73 which opposes the −24 volt bias on the grid of tube 23'. The low-pass R.-C. filter 74, 76, 77 shown in the grid circuit of the latter tube removes the carrier and provides a delay in the building-up of the direct-current grid voltage on this tube. Grid current flow in tube 23′ limits the voltage between grid and cathode to zero. When the rectified voltage across resistor 73 equals or is greater than the −24 volt bias, and the plate of tube 23′ is connected through a supervisory relay RS to a +130 volt battery, it furnishes supervisory information to a connecting circuit. When carrier is applied to the receiving filter input at normal level, plate current does not flow for about 150 milliseconds, but when the carrier input stops the supervisory relay current falls to zero in about 50 milliseconds. The longer delay insures against false operation of the supervisory relay due to bursts of noise, while the shorter delay provides a fast disconnect signal when the distant subscriber opens his power switch.

Fig. 4 shows a modified frequency shift telegraph carrier oscillator, which differs from the oscillator illustrated in Fig. 2, principally in the form of the varistor network utilized to switch from $\nu_1$ to $\nu_2$ and the omission of tuning coil L2 (see Fig. 2).

In the form of varistor network shown in Fig. 4, a bridge 80 of four varistors is utilized and connected to the secondary of transformer T11. Whenever a negative voltage is applied to the varistor bridge 80 through switching leads 81, 82 it effectively introduces a high impedance or open circuit condition in the secondary circuit of transformer T11, permitting the oscillator 20 to operate at its natural frequency $$\nu_1=\frac{1}{2\pi\sqrt{L_1C_1}}$$

Whenever a positive voltage is applied to the bridge 80 biasing the varistors in the conducting direction, condenser C2 is thereby connected across the secondary of transformer T11, causing the oscillator to operate at a lower carrier frequency $\nu_2$.

The leads 81, 82 are associated with a modulator tube such as tube 23 (Fig. 2), which is driven by the signals originating in a connecting direct-current telegraph circuit illustrated in Fig. 2. The varistor bridge 80 thereby functions as a series switch under the control of the aforementioned modulator tube, which conducts for an outgoing mark and is cut off for an outgoing space.

The system described is flexible and particularly adapted for use as trunks between central offices and circuits between central offices and toll subscriber circuits.

It should be understood that any reasonable number of two-way channels may be provided, for example, in the voice band twelve or more two-way channels may be conveniently provided over four-wire circuits and three two-way channels or six or more two-way channels over two-wire circuits in the range between 3850 and 5200 cycles, above the voice band.

It should likewise be understood that the marking and spacing frequencies $\nu_1$ and $\nu_2$ may be interchanged with respect to marking and spacing. The necessary circuit modifications therefore would be apparent to one skilled in the art.

What is claimed is:

1. A carrier wave telegraph system comprising a carrier oscillator adapted to generate two discrete frequencies for marking and spacing signals respectively, a frequency determining circuit connected thereto comprising a tuned circuit, an auxiliary reactance, and a bridge of varistors therebetween, and direct-current polar telegraph signals for biasing said varistors from a substantially infinite impedance to a low value to uncouple and couple said auxiliary reactance from said tuned circuit, a supervisory circuit connected to said oscillator and adapted to energize and deenergize it to provide supervisory pulses, a transmission line connected to said oscillator for transmitting said discrete frequencies and supervisory pulses.

2. A carrier wave telegraph system comprising an oscillator having a natural frequency determined by a parallel tuned circuit, auxiliary reactances coupled to said tuned circuit, a transformer having varistors in its secondary circuit, polar bias means for varying the impedance of said varistors from a high to a low value to shift the oscillator frequency for marking and spacing, a telegraph circuit for energizing and deenergizing said oscillator to provide supervisory signals, a transmission medium, and means for segregating said supervisory, marking and spacing signals, and means for detecting each signal.

3. A carrier wave telegraph system comprising a carrier oscillator adapted to generate two discrete frequencies for marking and spacing signals respectively, a frequency determining circuit connected thereto comprising a tuned circuit, an auxiliary reactance and a network containing varistors coupled to said tuned circuit, and a source of direct-current polar telegraph potentials for biasing said varistors from a substantially infinite impedance to a low value, a supervisory circuit connected to said oscillator and adapted to energize and deenergize it to provide supervisory pulses, and a transmission line connected to said oscillator for transmitting said discrete frequencies and supervisory pulses.

4. The structure of claim 3, and a tuned receiver for selecting said discrete frequencies connected to said line, an auxiliary receiver branched from said tuned receiver for detecting said supervisory signals, and a telegraph loop connected to said auxiliary receiver.

5. A carrier wave telegraph transmitter comprising an oscillator having a natural frequency determined by a parallel tuned circuit, auxiliary reactance coupled to said tuned circuit, a Wheatstone bridge network of varistors connected to said auxiliary reactance, a polar telegraph circuit connected to said bridge for varying the impedance of said varistors from a high to a low value to shift the oscillator frequency for marking and spacing, a telegraph circuit for energizing and deenergizing said oscillator to provide supervisory signals, a transmission medium, and means for segregating said supervisory, marking and spacing signals, and means for detecting each signal.

6. A carrier wave telegraph system comprising an oscillator having a resonance frequency determined by a parallel tuned circuit, auxiliary reactance coupled to said tuned circuit for shifting said resonance frequency, varistors connected to said auxiliary reactance for controlling its coupling to said tuned circuit, polar bias means for varying the impedance of said varistors from a high to a low value to shift the oscillator frequency for marking and spacing, a telegraph circuit for energizing and deenergizing said oscillator to provide supervisory signals including a power switch and power source for energizing said oscillator.

7. A carrier wave telegraph system comprising a carrier oscillator, a plurality of tunable circuits connectable thereto, a variable coupling between said tunable circuits and polar bias control means for said coupling whereby a plurality of discrete frequencies is generated by said oscillator at different times respectively, a telegraph circuit for energizing and deenergizing said oscillator to provide supervisory signals, a line for transmitting said frequencies and supervisory signals, a receiving filter, an amplifier limiter, and a double tuned discriminator circuit connected to said line for selecting said plural frequencies and a separate detector circuit for said supervisory signals branching therefrom.

8. A carrier wave telegraph system comprising sending and receiving terminals connected by a transmission line, the sending terminals comprising an oscillator adapted to generate two discrete frequencies $\nu_1$ and $\nu_2$ for marking and spacing signals respectively, the receiving terminals comprising a receiving filter, amplifier limiters and a discriminator circuit consisting of antiresonant circuits tuned to said frequencies $\nu_1$ and $\nu_2$ respectively, varistor diodes connected thereto, a variable potentiometer connected to said diodes and a pair of vacuum tubes operating as a single switch connected to said potentiometer, said potentiometer being adjustable to compensate for signal bias.

9. A carrier wave telegraph system comprising a sending and a receiving terminal connected by a transmission medium, the sending terminal comprising a carrier oscillator having two resonance frequencies $\nu_1$ and $\nu_2$, a modulator tube under the control of direct-current polar telegraph signals adapted to shift the oscillator resonance between said two frequencies $\nu_1$ and $\nu_2$, a telegraph loop, and a resistor connected between said loop and modulator tube to control the break characteristic, and a supervisory signal sending circuit connected to said oscillator, a receiver for said two resonance frequencies in said receiving terminal and a supervisory signal receiving circuit branching from said receiver.

10. The structure of claim 9, wherein said resistor is connected to a source of negative potential to control said modulator tube.

LELAND A. GARDNER.
JOHN L. HYSKO.

References Cited in the file of this patent

UNITED STATES PATENTS

| Number | Name | Date |
|---|---|---|
| 1,522,581 | Espenschied | Jan. 13, 1925 |
| 2,474,261 | Leibe et al. | June 28, 1949 |

FOREIGN PATENTS

| Number | Country | Date |
|---|---|---|
| 698,170 | Germany | Nov. 4, 1940 |